United States Patent [19]

Gray

[11] 4,229,028

[45] Oct. 21, 1980

[54] PIPE COUPLER

[75] Inventor: Paul E. Gray, Gnadenhutten, Ohio

[73] Assignee: Universal Sewer Pipe Company, Mogadore, Ohio

[21] Appl. No.: 971,216

[22] Filed: Dec. 20, 1978

[51] Int. Cl.$^2$ ............................................. F16L 21/02
[52] U.S. Cl. ................................... 285/235; 285/369; 285/383; 285/423
[58] Field of Search ............... 285/423, DIG. 12, 235, 285/236, 369, 383, 110, 345

[56] References Cited

U.S. PATENT DOCUMENTS

| 3,104,898 | 9/1963 | MacDonald et al. | 285/367 X |
| 3,394,952 | 7/1968 | Garrett | 285/236 |
| 3,419,290 | 12/1968 | Campbell et al. | 285/DIG. 12 |
| 3,484,121 | 12/1969 | Quinton | 285/423 X |
| 3,558,164 | 1/1971 | Hovell | 285/423 |

*Primary Examiner*—Dave W. Arola
*Attorney, Agent, or Firm*—Cushman, Darby & Cushman

[57] ABSTRACT

A coupler for connecting adjacent ends of clay pipe with a generally cylindrical flexible sealing member of urethane or the like having opposing inner and outer central grooves which extend circumferentially and pairs of circumferentially extending outer support grooves flanking the outer central groove. Rigid rings of fiberglass are provided in the grooves. The central ring has an inwardly extending stop portion and unitary sealing lips are provided on the interior surface of the sealing members between the support grooves of each pair.

4 Claims, 4 Drawing Figures

PIPE COUPLER

BACKGROUND AND SUMMARY OF THE INVENTION

The invention relates to a coupler for connecting together the adjacent straight ends of two clay, concrete, metal or similar pipes.

One long-standing object in the pipe industry, and particularly the clay pipe industry, has been the elimination of the clay bell end of the pipe which receives the straight end of another pipe in a male-female connection. Formation of bells on clay pipe requires an additional manufacturing step and also provides an inherent weak point for breakage of the pipe either during manufacture, or, even worse, after installation. In addition, the bells make the pipes difficult to stack and reduce the number of pipes which can be fired at any given time, in contrast to pipes having straight ends.

One approach which has been successfully employed is to form a separate bell on one end of a piece of straight clay pipe or the like by winding fiberglass about a mandrel and about the end to form a non-clay socket which can then be conventionally cured. The patent to Gray, U.S. Pat. No. 4,024,006, describes one such technique and structure in detail.

Another approach in the art has been to provide a separate coupling which is placed between the straight ends of adjacent pipes at the time of installation in the ground. Rigid cylindrical tubes of metal and various types of plastics have been tried. The difficulty with rigid tubes is that they do not permit shifting and movement of the pipe which often takes place as the ground settles. The result is that the coupler breaks or the pipes break, creating a leak either into or out of the pipe.

Alternatively, the coupler can be a flexible cylindrical tube made of rubber or similar material. The difficulty with such a flexible tube is in achieving a proper seating and sealing and in providing sufficient rigidity to adequately couple together two pipe ends.

Several attempts have been made in the past to in part combine rigid and flexible characteristics in a single coupling device. The patent to Havell U.S. Pat. No. 3,558,164, for example, describes a pipe coupling with an elastomeric cylindrical tube mounting a central pipe stop of rigid material. The elastomeric tube is wound about its entire length with fiberglass which provides a restraining sheath.

The patent to Viazzi U.S. Pat. No. 3,667,782 describes another coupling with a sleeve of material which can be resiliently deformed to seal together two straight pipe ends.

The patent to Garrett, U.S. Pat. No. 3,394,952, describes yet another joint of elastomeric material with central rigid portions extending down between the pipe ends, lips at either end for sealing and bands which compress the lips against the pipe to effect a seal.

The present invention relates to a coupler which combines a flexible sealing member with at least three rigid outer rings and one rigid inner ring, the resulting combination providing particularly satisfactory results and responding to all of the problems which have been encountered before with separate pipe couplers.

The present invention shares with couplers of the type described in the above-mentioned patents independence of the pipe itself and thus of the pipe manufacturing process. The coupler can be made at a location different from that where the pipe is made, and can be salvaged in the event of pipe breakage. The coupler can be installed on one end of the pipe at the pipe-producing plant or all the installation can take place at the time of installation. The coupler can be installed on field cut pipe as well as pipes that have formed radii or bevels on the pipe ends.

The present invention is particularly advantageous, however, in that the coupling has no loose parts that can be lost or left off during installation and requires no extra tools other than a lubricant to install. The coupler described in the patent to Garrett, for example, uses two bands on the ends thereof for compressing the elastomeric material and to thus effect the seal. However, the bands are conventional clamping elements and thus are external to the device and require special tools for installation.

The coupler of the present invention includes a generally cylindrical flexible sealing member with a central circumferentially extending groove on the outside periphery thereof. A similar groove extends circumferentially on the inside periphery opposite the outer groove mounts a rigid center ring which preferably has a stop surface extending radially inward for positioning pipes to be coupled together. Two pairs of support grooves flank the central groove on the outside of the flexible sealing member adjacent the ends thereof. Unitary sealing lips are provided on the inner surface of the flexible member between the pair of support grooves and opposite a band on the outer surface.

The specific construction will meet double A.S.T.M. requirements for clay pipe joints for infiltration-exfiltration, shear load and misalignment. Further, the combination of rigidity and flexibility permits the coupler to couple pipes which are substantially misaligned. This is particularly important since misalignment can take place during or after installation. Some variation in or out-of-roundness of pipes can be accepted because of the combination of rigidity and flexibility at the right places.

Other objects and purposes of the invention will be clear from the following detailed description of the drawings.

DETAILED DESCRIPTION OF THE DRAWINGS

Figure 1:
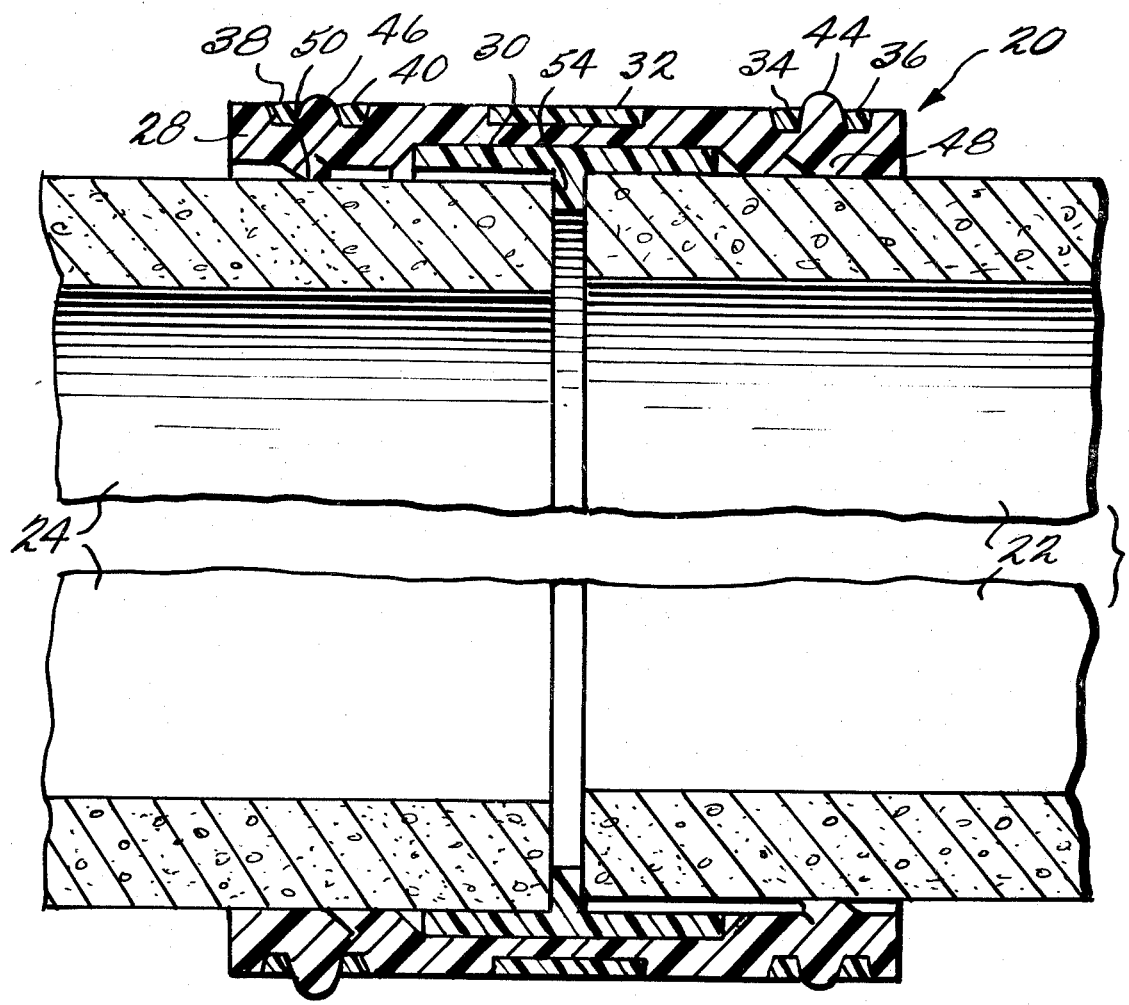
FIG. 1 shows a sectional view of a coupler in place between two slightly misaligned pipes.

FIG. 1 shows a sectional schematic view showing the coupler 20 of the present invention in position coupling together two straight ends of pipes 22 and 24 which carry a liquid. The pipes may be of any suitable material, such as clay, concrete, metal, etc., but the invention finds particular utility in coupling together clay pipes.

Coupler 20 is comprised of a flexible cylindrical tube 28, an inner rigid center ring 30, an outer rigid center ring 32 and two pairs of support rings on opposite ends of coupler 20, namely, support rings 34 and 36 and support rings 38 and 40. The rings are each disposed in respective grooves which are preferably formed during molding of the flexible member 28. Rings 34 and 36 separate a band of flexible material 46, both rings being generally opposite tapered sealing lips 48 and 50, respectively. The precise relationship of the rings, center band and sealing lips can be seen in detail in FIG. 2. Basically, the lips 50 and 48 are inwardly tapered so as to deform upon installation to provide a seal which is maintained even if the pipes should become slightly misaligned as shown in FIG. 1 or if they are slightly out-of-round, which is a common occurrence. Rigid center ring 30 includes a stop portion extending circumferentially radially inward to separate the two pipes and provide a locator permitting easy installation.

The inner ring 30 is preferably formed of rigid material such as fiberglass and polyester but could be made of other rigid material such as plastic, metal, etc. Ring 30 serves to position the coupling 20 on the two pipes 22 and 24 and provides the shear load qualities of the coupling. Ring 30 also provides the resistance required to keep the coupler from rotating when a shear load is applied to one of the pipes. Further, during assembly, the center ring 30 provides assistance in keeping the flexible member 28 round during the pouring operation as described below.

The flexible member 28 can be of any suitable material and a hardness of 45 to 60 durometer has been found to be satisfactory. The preferred material is urethane, but other materials, such as polyvinyl chloride, rubber, etc., have a hardness within this range and should be satisfactory.

The outer support rings 34, 36, 38 and 40 give a limited amount of stiffness to each end and this is particularly important when the pipes are being jointed to the coupler. Further, they provide a flexible non-stretch area to the flexible sealing member and the necessary compression to the sealing lips 48 and 50 to maintain a water-tight seal between pipes 22 and 24 and coupler 20. The compression is developed by stretching the lips 48 and 50 and compressing a portion of the lips between the pipe and the outer support rings. The location of the outer support rings on opposite sides of the sealing lips is critical to achieve displacement of bands 44 and 46 of the member 28 when coupled over a maximum size pipe.

Figure 2:
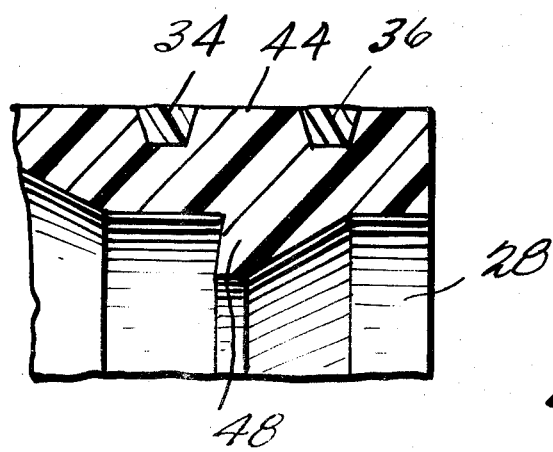
FIG. 2 shows an enlarged view of the coupler end.
Figure 3:
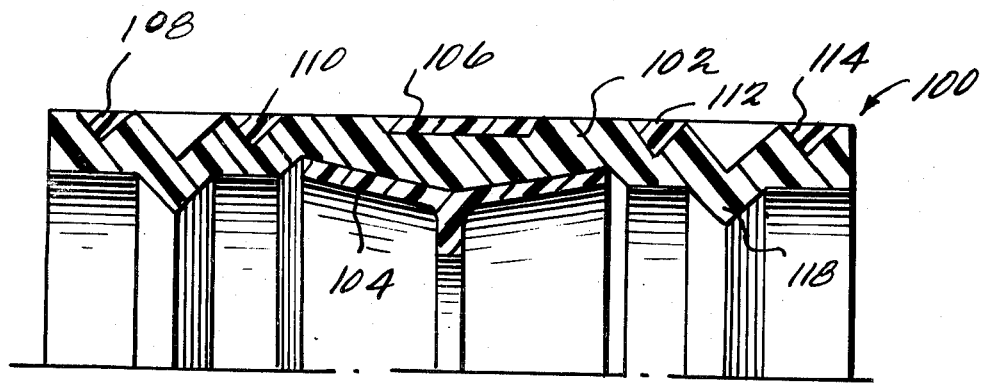
FIGS. 3 and 4 show sectional view of further embodiments of the invention.
Figure 4:
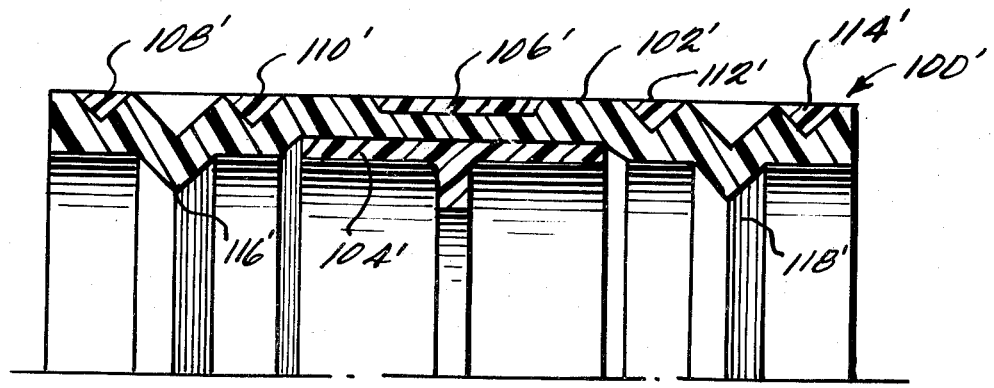

FIGS. 3 and 4 illustrate additional embodiments designed specifically for 8 and 6 inch pipes respectively. Couplers 100 and 100' are comprised of flexible cylindrical tubes 102 and 102', inner rigid center rings 104 and 104', outer rigid rings 106 and 106' and two pairs of support rings 108 and 108', 110 and 110', 112 and 112' and 114 and 114'. The support rings have a triangular cross-section and are disposed in mating grooves. Center rings 104 and 104' have stop portions extending circumferentially radially inward as in FIGS. 1 and 2.

Sealing lips 116 and 116', and lips 118 and 118' maintain a water-tight seal between the pipes. The portion of tubes 102 and 102' opposing each lip is removed to permit compression into the resulting grooves and superior sealing. A thin layer of fiberglass bridges the respective rings on either side of each void to provide good rigidity on the ends.

The embodiments of FIGS. 3 and 4 are preferably formed of the same materials as FIGS. 1 and 2.

One simple and unique technique for forming a coupler as described above is by first fabricating the center ring, for example, winding fiberglass and polyester resin around a flexible mandrel, placing the wound mandrel in a mold and pouring liquid material such as urethane, which can then be conventionally cured into the mold. The outside support rings and the center ring can then be easily formed by winding fiberglass and polyester resin onto the grooves.

The center ring is preferably fabricated using fiberglass and polyester resin with the mixture being wound around the flexible mandrel where it is formed into the proper shape. Once the piece has been wound, chemical reaction occurs in the polyester resin which causes the mixture of glass and resin to harden and rigidify.

After the piece has become sufficiently rigid, the flexible mandrel and the inner center ring are placed into a mold that forms the outside and bottom of the coupler. The outside portion of the mold is also flexible so the grooves for the outer support rings and the outer center ring can be formed. Urethane material is then poured between the mandrel with the inner center ring and the outside mold. Once this operation is finished, the urethane is allowed to cure. After curing, the mandrel center ring and the flexible sealing ring are stripped from the outside mold.

The outside support rings and the outside center ring are made of fiberglass and polyester and are wound in place in much the same manner as the inner center ring. These outer center rings are wound about the outside diameter of the flexible member 28. After the polyester resin is set up, the flexible mandrel is removed and the coupling is complete.

Many changes and modifications in the above-described embodiment of the invention can, of course, be carried out without departing from the scope of the invention. Accordingly, that scope is intended to be limited only by the scope of the appended claims.

What is claimed is:

1. A coupling for connecting the adjacent ends of two pipes comprising:
   a flexible sealing member having a generally cylindrical shape, an outer, central circumferentially extending groove on the outside periphery of said member, an inner circumferentially extending groove on the inside periphery of said member opposite said outer groove, first and second pairs of adjacent support grooves, each pair including first and second grooves circumferentially extending on the outside periphery of said member on either side of said outer groove, the grooves of each pair being separated by a flexible band of said member, and first and second unitary sealing lips extending radially inwardly from the inner periphery respectively opposite said bands, said lips compressing against said pipes to effect a seal and said bands displacing outwardly during connection of said two pipes;
   an inner rigid center ring disposed in said inner groove and having a stop surface extending radially inward for positioning pipes to be coupled together;
   an outer rigid center ring disposed in said outer groove; and
   first and second pairs of rigid support rings, each pair including first and second rings disposed respectively in said first and second support grooves.

2. A coupling as in claim 1, wherein said lips are axially tapered toward said inner center ring.

3. A coupling as in claim 1, wherein said rings are fiberglass and polyester resin, and said member is urethane.

4. A coupling as in claim 1, wherein said lips have a triangular cross-section and said member is grooved on the outside periphery opposite said lips.

* * * * *